(12) United States Patent
Kang (10) Patent No.: US 7,750,613 B2
(45) Date of Patent: Jul. 6, 2010

(54) REGULATOR AND METHOD FOR REGULATING

(75) Inventor: Yong hoon Kang, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 294 days.

(21) Appl. No.: 11/863,527

(22) Filed: Sep. 28, 2007

(65) Prior Publication Data

US 2008/0079411 A1 Apr. 3, 2008

(30) Foreign Application Priority Data

Sep. 29, 2006 (KR) .................. 10-2006-0096131

(51) Int. Cl.
*G05F 1/40* (2006.01)
(52) U.S. Cl. .................. 323/282; 323/283; 327/158
(58) Field of Classification Search .................. 327/87, 327/89, 101, 131, 156–158, 269–272, 365, 327/544, 540; 307/571, 573, 246, 270; 363/58–60
See application file for complete search history.

(56) References Cited

U.S. PATENT DOCUMENTS 5,565,812 A * 10/1996 Soenen ................. 327/558
6,828,851 B1 * 12/2004 Lee et al. ................. 327/537

FOREIGN PATENT DOCUMENTS

| JP | 2000-331489 | 11/2000 |
|---|---|---|
| JP | 2005-190533 | 7/2005 |
| KR | 1020060046999 A | 5/2006 |
| KR | 1020060070144 A | 6/2006 |

* cited by examiner

*Primary Examiner*—Rajnikant B Patel
(74) *Attorney, Agent, or Firm*—Volentine & Whitt, P.L.L.C.

(57) ABSTRACT

A regulator and a method for regulating include sensing an input voltage at a sensing unit and outputting a sensed voltage to a sensed voltage node. A bypassing unit receives the input voltage, bypassing the sensing unit, and applies the input voltage to the sensed voltage node. A comparison unit compares a the sensed voltage from the sensed voltage node to a reference voltage and outputs a comparison result signal.

17 Claims, 4 Drawing Sheets

REGULATOR AND METHOD FOR REGULATING

CROSS-REFERENCE TO RELATED PATENT APPLICATION

A claim of priority is made to Korean Patent Application No. 10-2006-0096131, filed Sep. 29, 2006, in the Korean Intellectual Property Office, the disclosure of which is incorporated herein in its entirety by reference.

BACKGROUND OF THE INVENTION

1. Field of the Invention

The present invention generally relates to semiconductor devices, and more particularly, the present invention relates to circuits and methods for regulating the output voltage of a charge-pump circuit used in a semiconductor integrated circuit.

2. Description of the Related Art

Semiconductor devices generally operate using a variety of internal voltages. For example, electrically-erasable-programmable non-volatile memory devices utilize a voltage exceeding a power supply voltage when conducting erasing and programming operations. This high voltage, or boosted voltage, is generally supplied by a charge-pump circuit.

Figure 1:
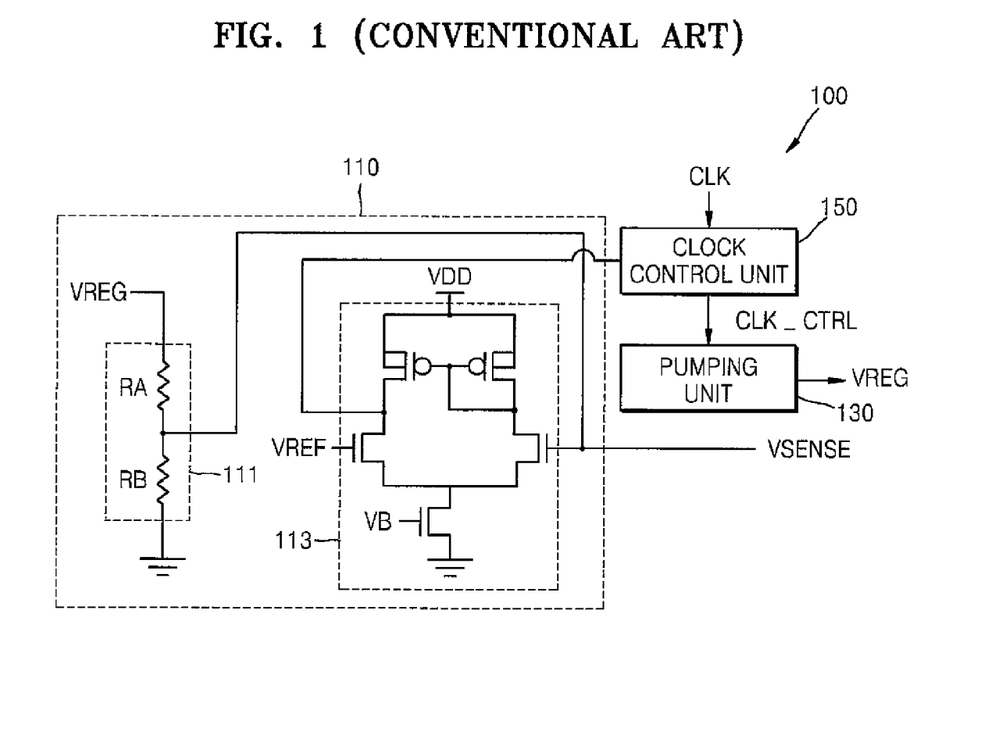
FIG. 1 is a block diagram of a conventional charge-pump circuit.

FIG. 1 is a block diagram of a conventional charge-pump circuit 100. The charge-pump circuit 100 includes a regulator 110, a pumping unit 130, and a clock control unit 150.

The regulator 110 includes a sensing unit 111 (implemented as a voltage divider with resistors RA and RB) and a comparison unit 113 (implemented as a differential amplifier driven by a supply voltage VDD and receiving a bias voltage VB). The regulator 110 senses a pumping voltage VREG output from the pumping unit 130 and maintains the pumping voltage VREG at a target high voltage. In particular, the sensing unit 111 outputs a sensed voltage VSENSE based on the pumping voltage VREG, and the comparison unit 113 causes the clock control unit 150 to activate the pumping unit 130 when the sensed voltage VSENSE is less than a reference voltage VREF, and to not activate the pumping unit 130 when the sensed voltage VSENSE is equal to or greater than the reference voltage VREF.

The clock control unit 150 receives a clock signal CLK and is responsive to the output of the regulator 110 to output the clock signal CLK as a controlled clock signal CLK_CTRL. In particular, the clock signal CLK (i.e., the controlled clock signal CLK_CTRL) is supplied to the pumping unit 130 only when the regulator 110 indicates that the sensed voltage VSENSE is less than the reference voltage VREF.

The pumping unit 130 is responsive to the controlled clock signal CLK_CTRL to output the pumping voltage VREG. The pumping unit 130 generates the pumping voltage VREG (which is higher than a power supply voltage VDD) by continuing or discontinuing a voltage pumping action according to the controlled clock signal CLK_CTRL. More particularly, when the pumping voltage VREG is less than the target high voltage (i.e., indicated by the sensed voltage VSENSE being less than the reference voltage VREF), the voltage pumping action continues in response to an ON-state of the controlled clock signal CLK_CTRL. On the other hand, when the pumping voltage VREG is equal to or greater than the target high voltage (i.e., indicated by the sensed voltage VSENSE being equal to or greater than the reference voltage VREF), the voltage pumping action is temporarily discontinued in response to an OFF-state of controlled clock signal CLK_CTRL.

As described above, the regulator 110 senses the pumping voltage VREG, generates a corresponding sensed voltage VSENSE, and controls activation and deactivation of the pumping unit 130 by comparing the sensed voltage VSENSE with the reference voltage VREF. Disadvantageously, a timing delay occurs between a time at which the regulator 110 senses the pumping voltage VREG and compares the same with the reference voltage VREF, and a time at which the voltage pumping action of the pumping unit 130 is controlled. This delay is primarily caused by a resistor-capacitor (RC) delay in the regulator 110.

Referring to FIG. 1, the resistance value of the resistor RA is generally much greater than the resistance value of a resistor RB. When the pumping voltage VREG is sensed and input as the sensed voltage VSENSE to the comparison unit 113, the sensed voltage VSENSE exhibits a relatively long RC delay caused by inter-capacitance and the high resistance of resistor RA.

Figure 2:
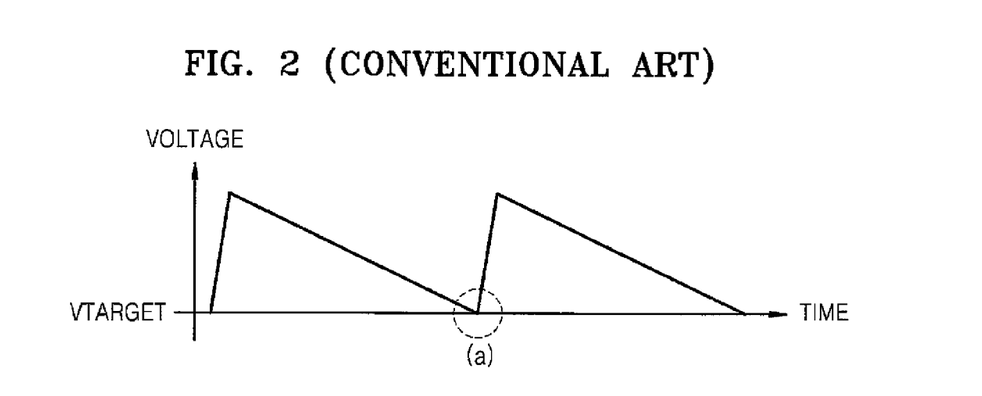
FIG. 2 is a timing chart illustrating a pumping voltage relative to a target high voltage of the charge-pump of FIG. 1.

FIG. 2 is a timing chart illustrating a pumping voltage relative to the target high voltage VTARGET. As shown in FIG. 2, a voltage ripple occurs in which actual pumping voltage overshoots the target high voltage VTARGET. This is caused by the high pumping capacity of the pumping unit 130 and the delay within the regulator 110, especially the resistor-capacitor (RC) delay of the regulator 110. The pumping unit 130 generally requires a high pumping capacity in order to rapidly increase the pumping voltage to the target high voltage VTARGET when starting a pumping operation. However, this high pumping capacity, coupled with the RC delay of the regulator 110, can cause substantial overshooting of the target high voltage VTARGET.

SUMMARY OF THE INVENTION

According to an aspect of the present invention, there is provided a regulator, including a sensing unit, a bypassing unit and a comparison unit. The sensing unit senses an input voltage and outputs a sensed voltage to a sensed voltage node. The bypassing unit receives the input voltage, bypassing the sensing unit, and applies the input voltage to the sensed voltage node. The comparison unit compares the sensed voltage of the sensed voltage node to a reference voltage and outputs a comparison result signal. The bypassing unit may include a capacitor.

According to another aspect of the present invention, there is provided a regulator a regulator including a sensing unit for sensing an input voltage and outputting a first sensed voltage, and a bypassing unit for receiving the input voltage, bypassing the sensing unit. A biasing unit biases the input signal received from the bypassing unit and outputs a second sensed voltage. A mixing unit mixes the first sensed voltage received from the sensing unit and the second sensed voltage received from the biasing unit, and outputs a mixed sensed voltage. A comparison unit compares the mixed sensed voltage and a reference voltage, and outputs a comparison result signal. The bypassing unit and/or the mixing unit may include a capacitor.

According to another aspect of the present invention, there is provided a regulator, including an input node for inputting an input voltage and a sensing node for receiving the input voltage from the input node and outputting a sensed voltage to a sensed voltage node. A bypassing unit receives the input voltage from the input node, bypassing the sensing node, and applies the input voltage to the sensed voltage node. A comparison unit compares the voltage of the sensed voltage node and a reference voltage, and outputs a result of the comparison.

According to another aspect of the present invention, there is provided a charge-pump circuit, which includes the regulator. The charge-pump circuit further includes a clock controller and a pump. The clock controller outputs a controlled clock signal in response to the comparison result output from the comparison unit. The pump generates a pumping voltage by performing a pumping operation in response to the controlled clock signal. The input voltage may be the pumping voltage.

According to another aspect of the present invention, there is provided a method of voltage regulating. The method includes receiving an input voltage at a sensor and outputting a sensed voltage based on the input voltage to a sensed voltage node, and receiving the input voltage, bypassing the sensor, and applying the input voltage to the sensed voltage node. The sensed voltage from the sensed voltage node is compared with a reference voltage, and a result of the comparison is output.

According to another aspect of the present invention, there is provided a method of voltage regulating. The method includes sensing an input voltage and outputting a first sensed voltage based on the input voltage; biasing the input signal and outputting a second sensed voltage based on the biased input signal; and mixing the first sensed voltage and the second sensed voltage and outputting a mixed sensed voltage. The mixed sensed voltage is compared to a reference voltage and a comparison signal is output.

According to another aspect of the present invention, there is provided a method of charge-pumping, which includes the method of voltage regulating. The method of charge-pumping further includes outputting a clock signal controlled according to the result of comparing the voltage of the sensed voltage node with the reference voltage, and generating a pumping voltage by performing a pumping operation in response to the controlled clock signal. The input voltage may be the pumping voltage.

BRIEF DESCRIPTION OF THE DRAWINGS

The embodiments of the present invention will be described with reference to the attached drawings, in which.

DETAILED DESCRIPTION OF THE EMBODIMENTS

The present invention will now be described more fully with reference to the accompanying drawings, in which exemplary embodiments of the invention are shown. The invention, however, may be embodied in various different forms, and should not be construed as being limited only to the illustrated embodiments. Rather, these embodiments are provided as examples, to convey the concept of the invention to one skilled in the art. Accordingly, known processes, elements, and techniques are not described with respect to some of the embodiments of the present invention. Throughout the drawings and written description, like reference numerals will be used to refer to like or similar elements.

Figure 3:
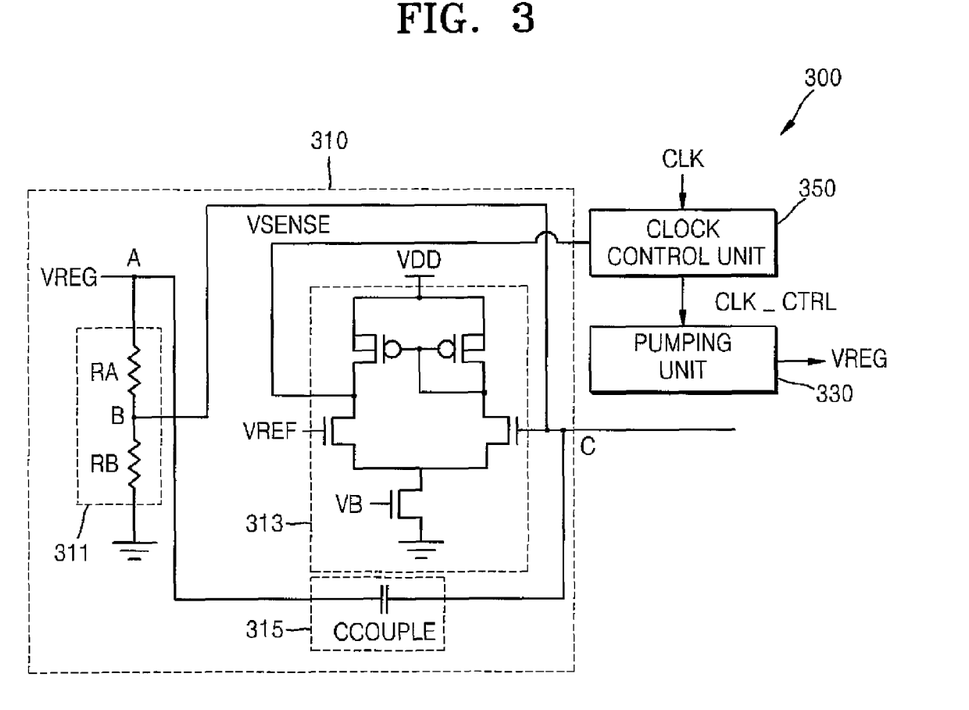
FIG. 3 is a block diagram of a charge-pump circuit, according to an exemplary embodiment of the present invention.

FIG. 3 is a block diagram of a charge-pump circuit 300, according to an exemplary embodiment of the present invention. The charge-pump circuit 300 of this example includes a charge-pump regulator 310, a clock control unit 350 and a pumping unit 330.

The clock control unit 350 may be implemented, for example, using a conventional switching circuit. As shown in FIG. 3, the clock control unit 350 receives a clock signal CLK and outputs the clock signal CLK as a controlled clock signal CLK_CTRL in response to an output signal of the regulator 310. In particular, the controlled clock signal CLK_CTRL is supplied to the pumping unit 330 when the regulator 310 indicates that the sensed voltage VSENSE is less than the reference voltage VREF.

The pumping unit 330 may be implemented, for example, using a conventional pumping circuit. As shown in FIG. 3, the pumping unit 330 outputs the pumping voltage VREG in response to the controlled clock signal CLK_CTRL. The pumping unit 330 generates the pumping voltage VREG (which is higher than a power supply voltage VDD) by continuing and/or discontinuing a voltage pumping action according to the controlled clock signal CLK_CTRL. More particularly, when the pumping voltage VREG is less than a target high voltage (i.e., the sensed voltage VSENSE is less than the reference voltage VREF), the voltage pumping action continues in response to an ON-state of the controlled clock signal CLK_CTRL. When the pumping voltage VREG is equal to or greater than the target high voltage (i.e., the sensed voltage VSENSE is equal to or greater than the reference voltage VREF), the voltage pumping action is temporarily discontinued in response to an OFF-state of controlled clock signal CLK_CTRL.

The regulator 310 includes a sensing unit 311, a bypass unit 315, and a comparison unit 313.

The sensing unit 311 senses an input voltage VREG (at input node A) and outputs a sensed voltage VSENSE (at sense node B). The input voltage VREG of the regulator 310 is a pumping voltage VREG output from the pumping unit 330. In the present exemplary embodiment, the sensing unit 311 is implemented by a voltage divider circuit, which includes a first dividing resistor RA and a second dividing resistor RB. Also, in this example, the resistance value of the first dividing resistor RA is significantly greater than the resistance value of the second dividing resistor RB. For example, assuming that the reference voltage VREF is 1 V and the target high voltage is 25 V, the resistance value of the first dividing resistor may be about 1.7 MΩ and the resistance value of the second dividing resistor may be about 71 kΩ.

As will be apparent to those skilled in the art, the reference voltage VREF may be determined experimentally or empirically, and is dependent upon the target high voltage and the internal circuit structure of the regulator 310.

The bypass unit 315 enables the input voltage VREG to bypass the sensing unit 311 and effectively couples the input voltage VREG and the sensed voltage VSENSE (at sensed voltage node C). The bypassing unit 315 may be implemented by a coupling capacitor CCOUPLE, for example, as shown in FIG. 3. However, the structure of the bypassing unit 315 is not limited to this embodiment, and may incorporate alternative structural implementations without departing from the spirit and scope of the present invention. The operation of the bypassing unit 315 is further explained, below.

The comparison unit 313 compares the sensed voltage VSENSE, as provided with the input voltage VREG at sensed voltage node C, to the reference voltage VREF, and outputs a signal indicating the comparison result, which is supplied to the clock control unit 350. The comparison unit 313 may be implemented by a differential amplifier, for example, as shown in FIG. 3. However, the structure of the comparison unit 313 is not limited to this embodiment, and may incorporate alternative structural implementations without departing from the spirit and scope of the present invention. In the depicted example, the differential amplifier of the comparison unit 313 is driven by a power supply voltage VDD, and receives a predetermined bias voltage VB. When the sensed voltage VSENSE is less than the reference voltage VREF, the comparison result may be a signal having a first level. The clock control unit 350 transmits the controlled clock signal CLK_CTRL to the pumping unit 330 in response to the first level comparison result signal. When the sensed voltage VSENSE is equal to or greater than the reference voltage VREF, the comparison may result in a signal having a second voltage level. The clock control unit 350 does not transmit the controlled clock signal CLK_CTRL to the pumping unit 330 in response to the second level comparison result signal.

As described with respect to FIG. 1, changes in the input voltage VREG of the regulator 110 experience a long RC delay, which are reflected in the sensed voltage VSENSE, causing a large ripple in the pumping voltage VREG.

In comparison, embodiments of the present invention enable the input voltage VREG to bypass the sensing unit 311 and be provided along with the sensed voltage VSENSE, in order to timely reflect changes in the input voltage VREG without a long RC delay. To achieve this, the input voltage VREG is sent through a coupling capacitor CCOUPLE, for example, of the bypassing unit 315. Referring again to FIG. 3, the bypassing unit 315 receives the input voltage VREG from the input node A and applies the input voltage VREG to the sensed voltage node C, which also receives the sensed voltage VSENSE of the sense node B. The sensed voltage VSENSE has a voltage captured in the second dividing resistor RB. Therefore, the changes in the input voltage VREG are quickly reflected in the sensed voltage VSENSE, without a long delay.

When the pumping voltage becomes greater than the target high voltage through the pumping operation of the pumping unit 330, the sensed voltage VSENSE also becomes greater than the reference voltage VREF, without a long delay. Accordingly, the clock control unit 350 stops transmitting the controlled clock signal CLK_CTRL to the pumping unit 330 (e.g., in response to the comparison result signal becoming the second level), so that the pumping unit 330 pauses pumping. Therefore, as compared to the charge-pump circuit 100 of FIG. 1, the charge-pump circuit 300 in FIG. 3 exhibits significantly less overshoot and ripple in the pumping voltage VREG.

Figure 4A:
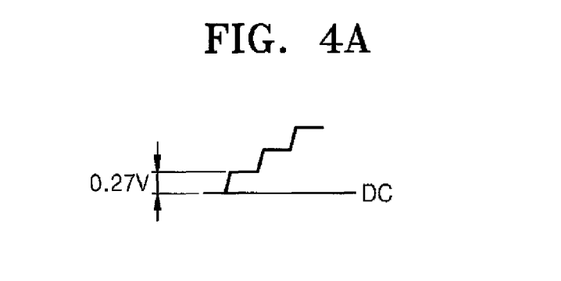
FIG. 4A illustrates an input voltage of FIG. 3 when a pumping operation is performed, according to an exemplary embodiment of the present invention.
Figure 4B:
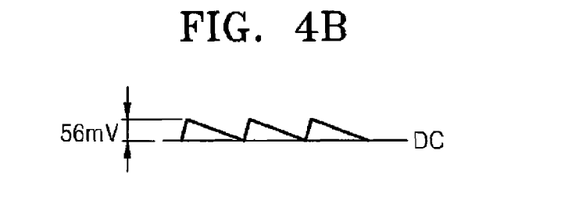
FIG. 4B illustrates a sensed voltage in FIG. 3 when a pumping operation is performed, according to an exemplary embodiment of the present invention.

The operation of the regulator 310, according to an exemplary embodiment of the present invention, will be explained more in detail, referring to FIGS. 4 through 6. FIG. 4A shows an input voltage of FIG. 3 when a pumping operation is performed in response to an activated pulse of a clock signal (e.g., controlled clock signal CLK_CTRL). FIG. 4B shows a sensed voltage VSENSE of FIG. 3 when a pumping operation is performed in response to the activated clock signal pulse. FIGS. 4A and 4B correspond to a pumping operation of the pumping unit 330, and the direct current (DC) in FIGS. 4A and 4B is an arbitrary DC level intended to show relative increases caused by the pumping operation.

The relationship between an increase in the pumping voltage VREG and an increase in the sensed voltage VSENSE can be described by the following equation:

$$\Delta V_{Sense} = \alpha \cdot \Delta V_{REG}$$

$$\text{where } \alpha = \frac{C_{Couple}}{C_{Total}} \cdot \frac{1}{1-k}, \text{ and } k = \frac{S(\text{Pump Slope})}{\eta \cdot 0.04 \cdot RC}$$

Here, $\Delta V_{sense}$ is the increase in the sensed voltage VSENSE, $\Delta V_{REG}$ is the increase in the pumping voltage VREG, $C_{Couple}$ is the capacitance of the coupling capacitor CCOUPLE of the bypassing unit 315, $C_{Total}$ is the overall capacitance of the regulator 310, S(Pump Slope) is a gradient showing the increase of the pumping voltage VREG under pumping, and $\eta$ is a value determined by the structure of the regulator or a resistor-capacitor (RC) delay.

In FIGS. 4A and 4B, it is assumed that the input voltage VREG is increased by 0.27 V in response to a period of the clock pulse of the pumping unit 330, and the sensed voltage VSENSE is increased by 56 mV as the input voltage VREG increases by 0.27 V.

As shown in FIG. 4A, while the pumping unit 330 is performing a pumping operation, the pumping voltage VREG increases by 0.27 V per clock period. However, as shown in FIG. 4A, the pumping operation is not performed continuously for the entire clock period. The pumping operation is only performed for a portion of one clock period. Accordingly, the pumping voltage VREG increases for a portion the clock period to an increased value, and the increased value of the pumping voltage VREG remains substantially constant until the next pumping operation, which occurs in the next clock period.

Whenever the pumping voltage VREG is increased by 0.27 V, the sensed voltage VSENSE is increased by 56 mV, for example. In an embodiment of the present invention, a current path is provided from the sense node B through a second sense resistor RB to the ground, where the second sense resistor RB has a relatively small resistance value, so that the RC delay from the sense node B to ground is short.

Thus, while the pumping voltage VREG remains constant after increasing incrementally by 0.27 V, the current of the sense node B flows out through the current path from the sense node B to the ground and the sensed voltage VSENSE accordingly decreases. The sensed voltage VSENSE eventually drops to the value before the pumping operation. These changes to the sensed voltage VSENSE repeat in response to each pulse of the pumping operation. Accordingly, the sensed voltage VSENSE has a waveform shown in FIG. 4B. Also, the DC level of the sensed voltage VSENSE increases proportionally to each increase of the pumping voltage VREG, shown in FIG. 4A.

Figure 5:
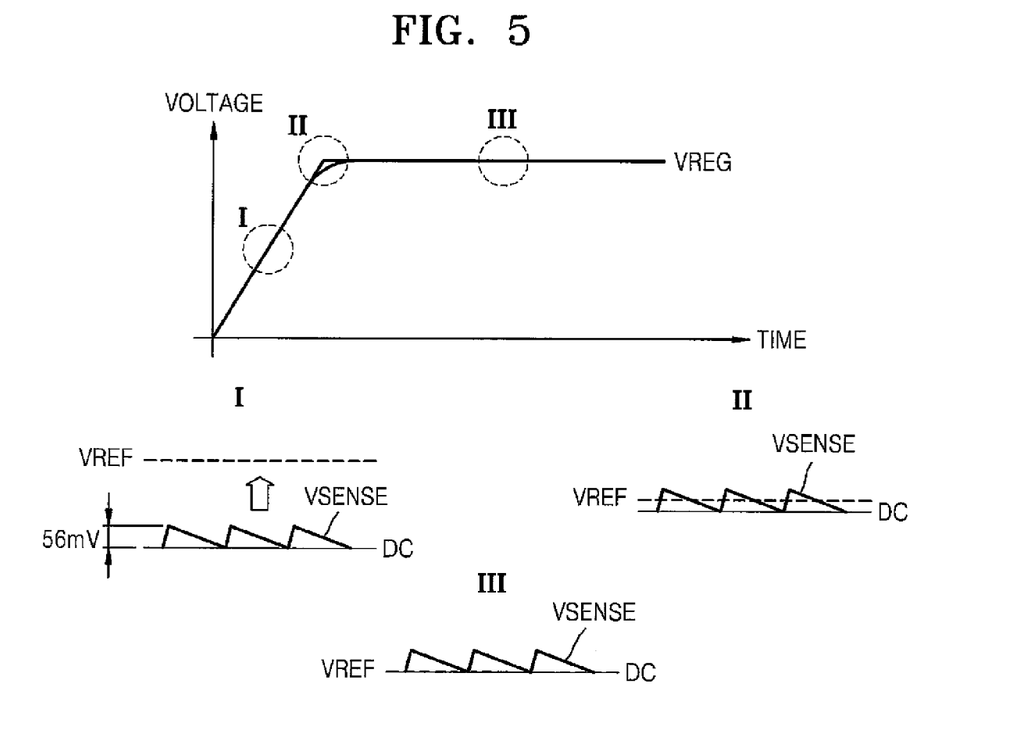
FIG. 5 illustrates a pumping voltage of a charge-pump circuit, according to an exemplary embodiment of the present invention.

FIG. 5 is a graph illustrating the operation of the charge-pump circuit 300, according to an exemplary embodiment of the present invention. As depicted, the operation of the charge-pump circuit 300 is categorized into 3 sections, according to whether the pumping voltage VREG has reached the target high voltage.

First, in section I of the graph illustrated in FIG. 5, during which the pumping voltage VREG has not yet reached the target high voltage, the sensed voltage VSENSE is likewise less than the reference voltage VREF. Accordingly, the clock control unit 350 continues to transmit a controlled clock signal CLK_CTRL to the pumping unit 330, e.g., in response to a comparison result signal having the first level, as discussed above. The pumping unit 330 thus continues voltage pumping in response to each pulse of the clock signal, increasing the pumping voltage VREG.

The DC level of the sensed voltage VSENSE also continuously increases, since the pumping voltage VREG continuously increases. However, as the DC level of the sensed voltage VSENSE is increasing, an envelope of the sensed voltage VSENSE increases relative to the DC level each time the pumping voltage VREG periodically increases, and the envelope of the sensed voltage VSENSE decreases relative to the DC level each time the pumping voltage VREG sustains the increased voltage.

Next, in section II of FIG. 5, during which the pumping voltage VREG approaches the target high voltage, the sensed voltage VSENSE repeatedly exceeds and drops below the reference voltage VREF. This causes the comparing unit 313 to signal the clock control unit 350 to turn the pumping unit 330 ON and OFF.

In section III, during which the pumping voltage VREG has reached the target high voltage, the DC level off the sensed voltage VSENSE is effectively the same as the reference voltage VREF. The sensed voltage VSENSE increases while the pumping voltage VREG is increasing and decreases while the pumping voltage VREG sustains the increased voltage. While the sensed voltage VSENSE is greater than or equal to the reference voltage VREF, the pumping unit 330 pauses voltage pumping.

In both sections II and III, the sensed voltage VSENSE increases and then decreases, so that the sensed voltage VSENSE becomes equal to the reference voltage VREF. When the sensed voltage VSENSE is equal to or greater than the reference voltage VREF, the pumping unit 330 pauses, and when the sensed voltage VSENSE is less than the reference voltage VREF, the pumping unit 330 resumes voltage pumping.

Accordingly, when the sensed voltage VSENSE is equal to or greater than the reference voltage VREF, the regulator 310 causes the pumping unit 330 to pause by outputting the comparison result signal having the second level. In embodiments of the present invention, the input voltage VREG is provided to the sensed voltage node C after passing through the bypassing unit 315, along with the sensed voltage VSENSE, so that changes in the input voltage VREG are reflected in the sensed voltage VSENSE. Accordingly, the operation of the pumping unit 330 is paused after one period of a pulse of the clock CKL.

Also, as previously explained, because the current at sense node B flows out through the second sense resistor RB, which has a low resistance value to ground (an RC delay is small), the sensed voltage VSENSE is able to reflect the changes in the input voltage VREG.

Figure 6A:
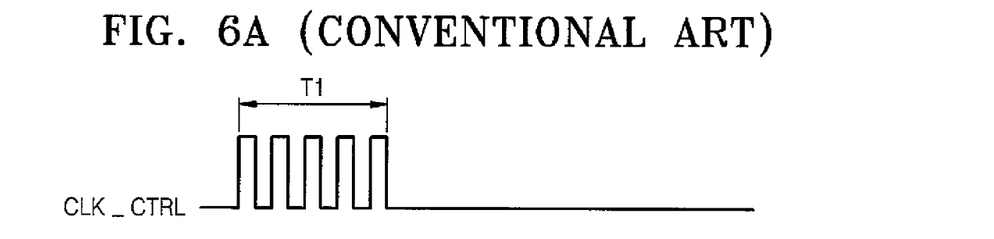
FIG. 6A illustrates a controlled clock signal in the charge-pump circuit in FIG. 1.
Figure 6B:
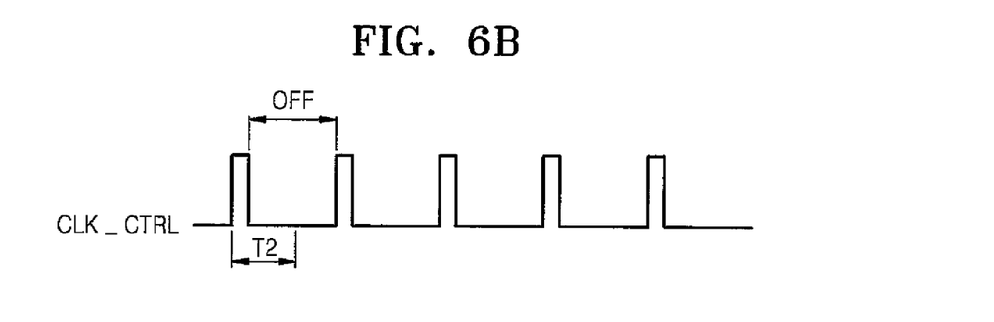
FIG. 6B illustrates a controlled clock signal in the charge-pump circuit in FIG. 3, according to an exemplary embodiment of the present invention.

FIG. 6A is a timing diagram of the controlled clock signal CLK_CTRL in the charge-pump circuit in FIG. 1, and FIG. 6B is a diagram of the controlled clock signal CLK_CTRL in the charge-pump circuit in FIG. 3, according to an exemplary embodiment of the present invention.

As described with respect to FIG. 1, the changes in the pumping voltage VREG are not reflected in the sensed voltage VSENSE because of the long RC delay, even after the pumping voltage VREG exceeds the target high voltage of the regulator 110. Thus, the regulator 110 continues to output a comparison result during the long RC delay T1, causing the clock control unit 150 to continuously transmit the controlled clock signal CLK_CTRL to the pumping unit 130 during T1, as indicted in FIG. 6A. In other words, even though the pumping voltage VREG is equal to or greater than the target high voltage during the RC delay, the pumping unit 130 continues pumping, causing a large overshoot and ripple in the pumping voltage VREG.

In embodiments of the present invention, the changes in the pumping voltage VREG are reflected in the sensed voltage VSENSE without a delay, by sending the pumping voltage VREG through the bypassing unit 315 (bypassing the sensing unit 311) to the sensed voltage node C, along with the sensed voltage VSENSE. Accordingly, the regulator 310 outputs a comparison result having the second level by immediately sensing when the pumping voltage VREG becomes greater than the target high voltage. Accordingly, the clock control unit 350 does not transmit the controlled clock signal CLK_CTRL to the pumping unit 330 throughout T2, as indicted in FIG. 6B. Thus, overshoot and ripple in the pumping voltage VREG are significantly decreased, since the pumping unit 330 pauses pumping in a timely manner.

Figure 7:
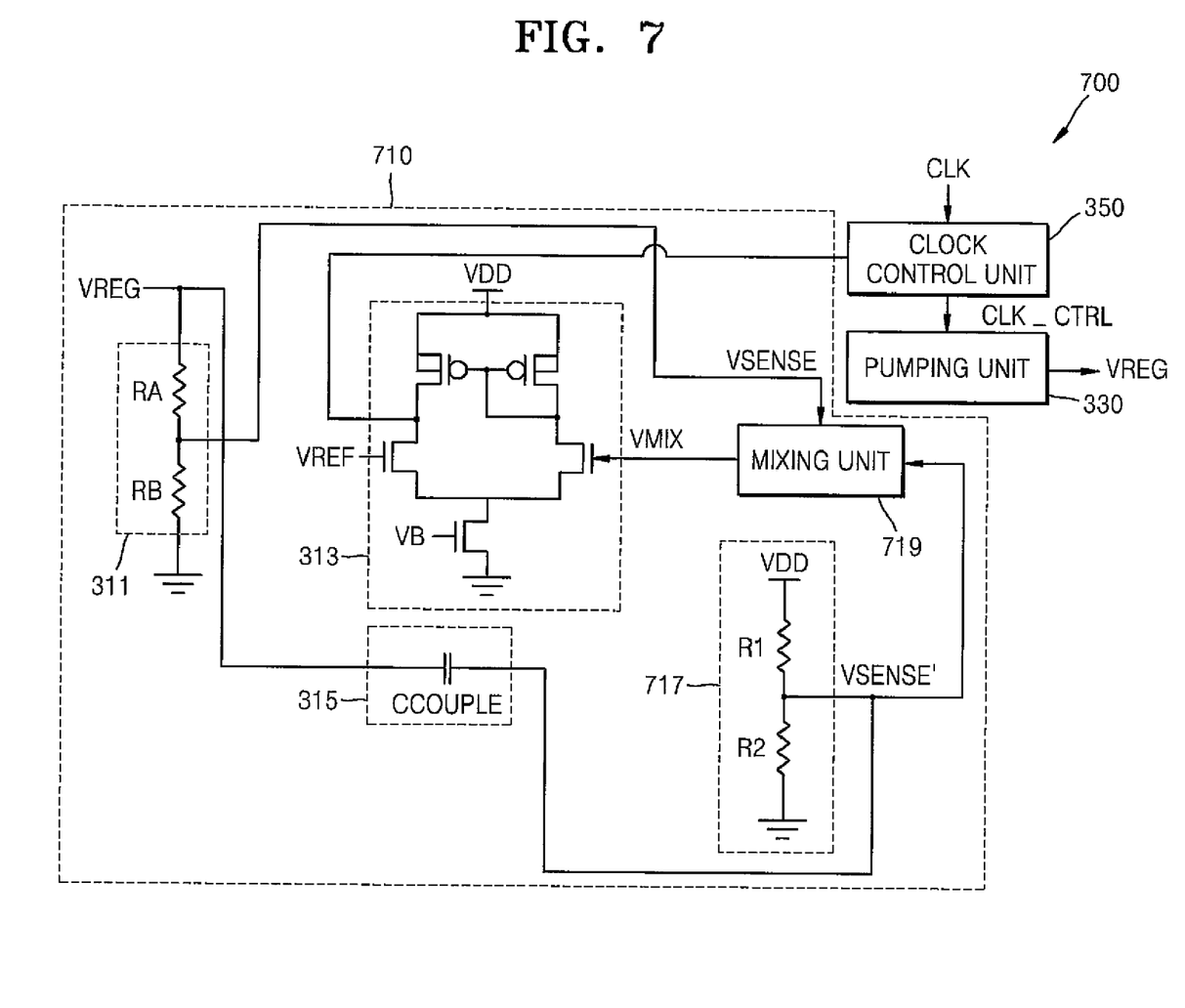
FIG. 7 is a block diagram of a charge-pump circuit, according to another exemplary embodiment of the present invention.

FIG. 7 is a block diagram of a charge-pump circuit 700, according to another exemplary embodiment of the present invention. Operation of the charge-pump circuit 700 is substantially the same as the operation of the charge-pump circuit 300, except that a regulator 710 of the charge-pump circuit 700 further includes a biasing unit 717 and a mixing unit 719. Accordingly, explanation of FIG. 7 will be directed to these additional elements.

In the exemplary embodiment of the present invention shown in FIG. 7, an RC delay of a signal input to the comparison unit 313 can be controlled by biasing the input signal, received from the bypassing unit 315, and ripple can be amplified so that a ripple in the pumping voltage VREG can have a gain, if necessary, by mixing the sense signal VSENSE (e.g., as described with respect to FIG.3) and the biased input signal.

The sensing unit 311 senses the input voltage VREG and outputs a first sensed voltage VSENSE. The bypassing unit 315 receives the input voltage VREG, bypassing the sensing unit 311. The biasing unit 717 biases the bypassed input signal from the bypassing unit 315. The biased signal is output as a second sensed voltage VSENSE'.

In various embodiments of the present invention, the biasing unit 717 may incorporate any structure capable of biasing the bypassed input signal, without departing from the spirit and scope of the present invention. In the exemplary embodiment depicted in FIG. 7, the biasing unit 717 includes a voltage divider circuit. Accordingly, as apparent to those skilled in the art, the RC delay of the regulator 710 can be controlled, for example, by controlling a first bias resistor R1 and a second bias resistor R2.

The mixing unit 719 mixes the first sensed voltage VSENSE and the second sensed voltage VSENSE', and outputs the mixed sensed voltage VMIX. In various embodiments, the mixing unit 719 may incorporate any structure capable of mixing multiple signals, including a coupling capacitor, for example, without departing from the spirit and scope of the present invention.

Also, the mixed sensed voltage VMIX may be amplified while mixing the first sensed voltage VSENSE and the second sensed voltage VSENSE' so that a ripple can have a gain.

Meanwhile, the comparison unit 313 compares the mixed sensed voltage VMIX and the reference voltage VREF, and outputs a comparison result signal having either the first level or the second level, as described above. The operations of the clock control unit 350 and the pumping unit 330, in response to the comparison result signal of the comparison unit 313 have been previously explained with reference to FIG. 3, and therefore will not be repeated.

In the exemplary embodiment of FIG. 7, the RC delay of the regulator 710 can be controlled by the input signal bypassing the sensing unit 311 and biasing the bypassed input signal, as described above. Also, the ripple can be amplified by controlling a gain while mixing the first sensed voltage VSENSE and the second sensed voltage VSENSE' at the mixing unit 719. Accordingly, various factors can be easily controlled in the charge-pump circuit in FIG. 7.

As described above, embodiments of the present invention provide a regulator and a regulating method which reduce delay and/or ripple in a signal by effectively coupling a sensed voltage and an input voltage, which bypasses a sensing unit. Accordingly, the voltage of the regulated signal can be constantly maintained.

While the present invention has been shown and described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A regulator comprising:
a sensing unit for sensing an input voltage and outputting a sensed voltage to a sensed voltage node;
a bypassing unit for receiving the input voltage, bypassing the sensing unit, and applying the input voltage to the sensed voltage node, so that a change in the input voltage is reflected in the sensed voltage at the sensed voltage node; and
a comparison unit for comparing the sensed voltage from the sensed voltage node to a reference voltage and outputting a comparison result signal.

2. The regulator of claim 1, wherein the bypassing unit comprises a capacitor.

3. A charge-pump circuit including the regulator of claim 1, comprising;
a clock control unit for outputting a controlled clock signal in response to the comparison result signal output from the comparison unit; and
a pump unit for generating a pumping voltage by performing a pumping operation in response to the controlled clock signal,
wherein the input voltage comprises the pumping voltage.

4. A regulator comprising:
a sensing unit for sensing an input voltage and outputting a first sensed voltage;
a bypassing unit for receiving the input voltage, bypassing the sensing unit;
a biasing unit for biasing the input voltage received from the bypassing unit and outputting a second sensed voltage, a change in the input voltage being reflected in the second sensed voltage based on the input voltage received from the bypassing unit;

a mixing unit for mixing the first sensed voltage received from the sensing unit and the second sensed voltage received from the biasing unit, and outputting a mixed sensed voltage; and
a comparison unit for comparing the mixed sensed voltage and a reference voltage and outputting a comparison result signal.

5. The regulator of claim 4, wherein the bypassing unit comprises a capacitor.

6. The regulator of claim 4, wherein the mixing unit comprises a capacitor.

7. A charge-pump circuit including the regulator of claim 4, comprising:
a clock control unit for outputting a clock signal controlled according to the comparison result signal; and
a pump unit for generating a pumping voltage by performing a pumping operation in response to the controlled clock signal,
wherein the input voltage comprises the pumping voltage.

8. A regulator comprising:
an input node for inputting an input voltage;
a sensing unit for receiving the input voltage from the input node and outputting a sensed voltage to a sensed voltage node;
a bypassing unit for receiving the input voltage from the input node and applying the input voltage to the sensed voltage node, bypassing the sensing node, so that a change in the input voltage is reflected in the sensed voltage at the sensed voltage node; and
a comparison unit for comparing the sensed voltage from the sensed voltage node and a reference voltage, and for outputting a result of the comparison.

9. The regulator of claim 8, wherein the bypassing unit comprises a capacitor.

10. A charge-pump circuit including the regulator of claim 8, comprising:
a clock control unit for outputting a clock signal according to the comparison result of the comparison unit; and
a pump unit for generating a pumping voltage by performing a pumping operation in response to the controlled clock signal,
wherein the input voltage comprises the pumping voltage.

11. A method of voltage regulating, comprising:
receiving an input voltage at a sensor and outputting a sensed voltage based on the input voltage to a sensed voltage node;
applying the input voltage to the sensed voltage node by bypassing the sensor, so that a change in the input voltage is reflected in the sensed voltage at the sensed voltage node; and
comparing the sensed voltage from the sensed voltage node with a reference voltage and outputting a result of the comparison.

12. A method of charge-pumping including the method of claim 11, the method comprising:
outputting a clock signal controlled according to the result of comparing the voltage of the sensed voltage node wit the reference voltage; and
generating a pumping voltage by performing a pumping operation in response to the controlled clock signal,
wherein the input voltage comprises the pumping voltage.

13. A method of voltage regulating, comprising;
sensing an input voltage and outputting a first sensed voltage based on the input voltage;
biasing the input voltage, which bypasses the sensing, and outputting a second sensed voltage based on the biased input voltage, the second sensed voltage reflecting a change in the input voltage;

mixing the first sensed voltage and the second sensed voltage and outputting a mixed sensed voltage; and comparing the mixed sensed voltage to a reference voltage and outputting a comparison signal.

14. The method for charge-pumping including the method of claim 13, the method comprising:

outputting a clock signal controlled according to the comparison signal; and generating a pumping voltage by performing a pumping operation in response to the controlled clock signal, wherein the input voltage comprises the pumping voltage.

15. The regulator of claim 1, wherein the change in the input voltage is reflected in the sensed voltage at the sensed voltage node without a resistor-capacitor (RC) delay of the regulator.

16. The regulator of claim 8, wherein the change in the input voltage is reflected in the sensed voltage at the sensed voltage node without a resistor-capacitor (RC) delay.

17. The method of claim 11, wherein the change in the input voltage is reflected in the sensed voltage at the sensed voltage node without a resistor-capacitor (RC) delay.

* * * * *